Figure 1:
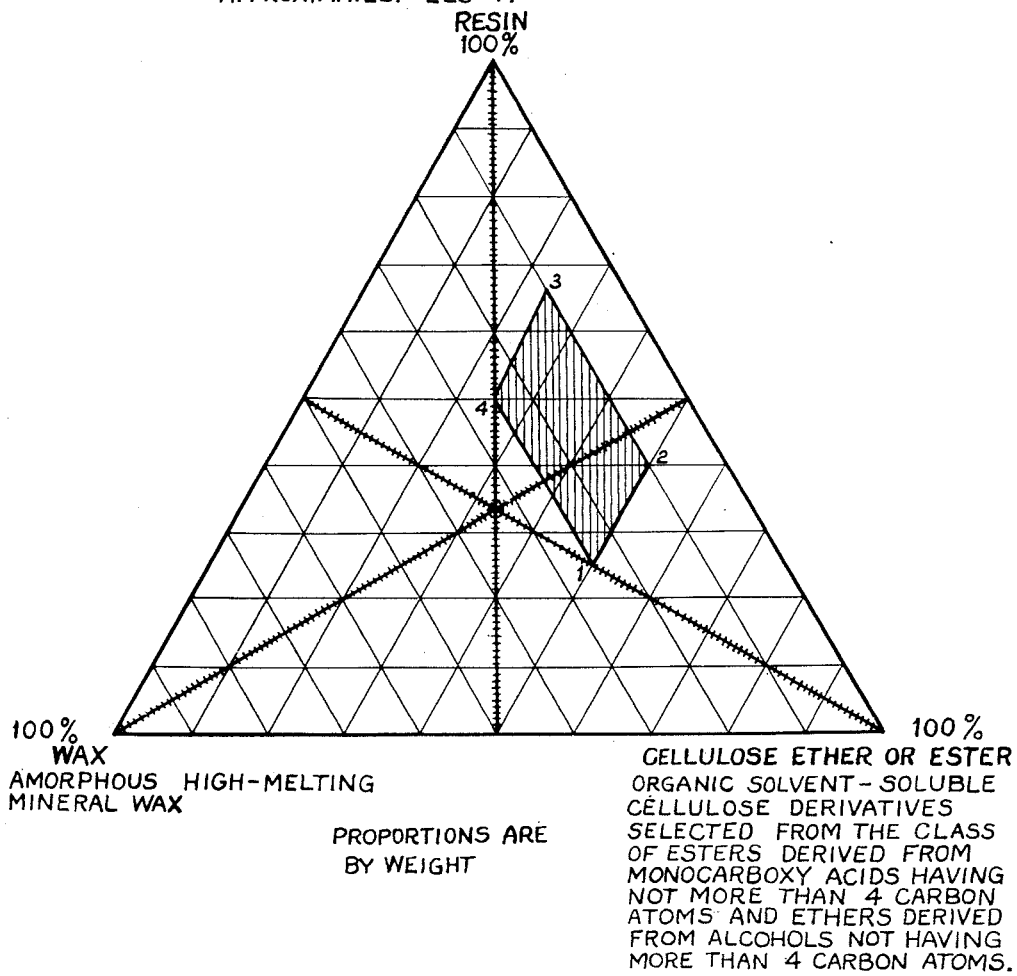

COMPOSITION OF HEAVY STICK CORROSION INHIBITOR

PROPORTIONS ARE BY WEIGHT

INVENTORS,
WILLIAM F. GROSS,
CHARLES C. ROGERS JR
BY W. L. Church
ATTORNEY

Patented June 3, 1952

2,599,384

UNITED STATES PATENT OFFICE

2,599,384

SOLID STICK CORROSION INHIBITORS AND A PROCESS FOR PREVENTING CORROSION OF OIL AND GAS WELL EQUIPMENT

William F. Gross, Webster Groves, Mo., and Charles C. Rogers, Jr., San Antonio, Tex., assignors to Petrolite Corporation, Ltd., Wilmington, Del., a corporation of Delaware Application April 8, 1950, Serial No. 154,824

8 Claims. (Cl. 252—8.55)

This invention relates to the inhibition of corrosion of metals, and especially to a composition for use in preventing corrosion of iron, steel, and ferrous alloys.

One object of our invention is to provide a novel process for preventing corrosion of metal equipment of oil and gas wells.

Another object of our invention is to provide a novel corrosion inhibitor that can be used successfully to inhibit corrosion of gas and oil well equipment that is difficult or impossible to protect with conventional corrosion inhibitors.

More specfically, our invention is concerned with the use of a composition in the form of a solid, under ordinary atmospheric conditions, which makes it particularly adaptable and effective under certain conditions hereinafter described. The solid form enjoys the unusual property of having a specific gravity in excess of 1.5, which opens up an entirely new field of application and use.

As will be pointed out subsequently, the dense or extra-heavy corrosion-preventing solid in stick form which has been developed and used industrially, usually consists of not less than five components:

(a) The corrosion-preventing inhibitor per se;
(b) The weighting material; and
(c), (d) and (e) Three nonrelated amorphous solids, which, in combination and within the specific limits hereinafter pointed out, give a suitable unit structure both from a physical and chemical standpoint.

Numerous products have been found to be successful in the inhibition of corrosion of ferrous alloys. These products, together with certain solutions, blends, or mixtures of these products in other materials, such as oils, waxes and resins, have been described in U. S. Patents Nos. 2,466,-530, 2,468,163 and 2,466,517.

For purposes of convenience, the subsequent text appears in four sections, which, although not divided, obviously deal with varying phases of the invention. In the text immediately following there is a consideration of the problem as it appears in the oil and gas industry and the problem presented as far as an economical solution is concerned. The next succeeding text is concerned with what would at first glance appear to be an obvious solution, to wit, an effort to modify existing corrosion-preventing solids in stick form, so as to yield a suitable solid which would be adaptable to use as hereinafter described.

The third part of the text is devoted to the various problems which represent an inherent and integral problem as far as the manufacture of these corrosion-preventing solids are concerned, and also, as far as their use is concerned. It is this particular part of the text which points out that the solution of the problem was beyond the usual approach available in a situation of this kind. The fourth part of the text is concerned with the preparation of suitable corrosion-inhibiting solids in stick form, which have been proven to be of outstanding value in actual industrial use.

Where an oil well, for example, is so completed that the annular space between tubing and inside casing is open at the well bottom, an inhibitor is usually employed in liquid form. The liquid is conventionally fed into the well annulus by means of a motor-driven chemical injection pump, or it may be dumped periodically (e. g., once every day or two) into the annulus by means of a lubricator or other metering device.

Occasionally oil and gas wells are completed in such a manner that there is no opening between the casing and the bottom of the tubing, i. e., the annulus is not open at the well bottom. This results, for example, when the tubing is surrounded at some point by a packing held by the casing or earth formation below the casing. Such wells are considered to be "packed" or "plugged-off," and where the annulus is filled with mud, "mudded-off."

For treating wells with packed-off tubing, the use of solid plugs or "sticks" of inhibitor is especially convenient, although the well may be treated by a liquid under certain special conditions, i. e., where large volumes of liquid may be intrdouced at one time, where it is permissible to keep the well closed in for extended periods of time, and where the tubing is relatively free of liquid at the time of treatment. In general, treatment of packed-off wells is by means of solid organic inhibitors, usually molded or formed into rods or sticks. These may be prepared by blending the inhibitor with a mineral wax, asphalt, or resin in a proportion sufficient to give a moderately hard and relatively high-melting solid (i. e., softening point above 175° F. ASTM ring and ball method), which can be handled and fed into the well tubing conveniently by means of a lubricator.

However, quite frequently the completion or operating characteristics of an oil or gas well are such as to preclude the treatment for corrosion by liquids and also by the solid form of inhibitor of common density, i. e., a density of 1.0 or less, which is obtained by the use of waxes, asphalts, or resins. Such wells include gas or gas-condensate wells that cannot be shut in for more than a few minutes at a time, and the 15-20 minutes necessary for the fall of a solid of common density is not allowable or advisable. Also included are packed-oil wells where the tubing, after the shutting in, remains substantially or completely filled with oil, brine, or oil-brine emulsion, as is usually the case with gas-lift wells and flowing oil wells.

It has been calculated that in a tubing 2½ inches in diameter (a size common in oil and gas wells) filled with a fluid of density 1.0 (the approximate average density of an oil-brine emulsion), a stick of inhibitor 1½ inches in diameter would require the following time to fall 5,000 feet:

| Density of Stick | Minutes/ 5000 ft. |
|---|---|
| 1.0 | ∞ |
| 1.2 | 40 |
| 1.4 | 30 |
| 1.6 | 25 |
| 1.8 | 20 |
| 2.0 | 16 |

Since it is not practical to shut in a well for the purposes of introducing a material for periods longer than 30 minutes, and impossible for periods longer than 24 hours, solids of a density less than 1.5 are of little value. The successful introduction of an inhibitor, consequently, depends entirely upon its density being 1.5, or preferably, greater.

Reference is made to the aforementioned patent U. S. No. 2,466,530 in which certain examples teach the manufacture of suitable inhibitors per se, and certain examples teach the manufacture of conventional sticks from such inhibitors. For purposes of convenience and for other obvious reasons, certain information of said patent is herein repeated in substantially verbatim form, except that the corrosion preventive products identified as Examples 1 and 2, are hereinafter referred to as Inhibitors A and B:

INHIBITOR A

"20 parts of maleic anhydride and 54 parts of an equal molal mixture of octadecenyl and octadecylamine were placed in a reaction vessel equipped with gas inlet tube, stirrer, heater and take-off tube. The mixture was brought to a temperature of 180° C. and held for six hours. During the last hour a slow stream of nitrogen was passed through the reaction mixture to complete removal of water of reaction. About 3.3 parts of water were obtained. On cooling, the product was a hard, resinous solid, readily soluble in benzol and other hydrocarbon solvents.

INHIBITOR B

"54 parts of octadecyl amine were substituted for the mixture of amines of Inhibitor A. Otherwise the procedure is identical with that of Inhibitor A immediately preceding."

*Corrosion-preventive composition No. 1*

| | Parts |
|---|---|
| Product of Inhibitor B | 70 |
| Ozokerite wax | 30 |

"The above were melted together and cast into cylinders 1¼ inch in diameter by 18 inches long. These are suitable for dropping down the tubing of wells."

*Corrosion-preventive composition No. 2*

| | Parts |
|---|---|
| Product of Inhibitor A | 50 |
| Petroleum resin ("Velsicol") | 25 |
| High-melting paraffin wax | 25 |

"The above were melted together and cast into sticks as in Corrosion-preventive composition No. 1."

At first examination, addition of the weighting material would seem to be merely a physical modification. In actual practice, it was found that there were innumerable problems presented in manufacture, packaging, use, storage, transportation, etc., which were not susceptible to solution by any predeterminable processes or knowledge.

Without attempting to note all these difficulties at this particular time, it will be sufficient to simply say that hundreds upon hundreds of samples were prepared, examined, and discarded for a variety of reasons hereinafter noted in detail. Such examination started in a manner that was purely logical, to wit, a tertiary mixture consisting of inhibitor, weighting material, and vehicle, with the vehicle consisting of only one component. Hundreds of samples were so prepared, using hundreds of the amorphous solids ranging from material such as synthetic resins to waxes, polymers, and various other materials within this enormously wide category. These tests were invariably failures.

The next examination again involved a tertiary system, i. e., those in which the same materials were used as previously (inhibitor, weighting material, and vehicle), but the vehicle, instead of being composed of a single component, was composed of two components. The two-component vehicle involved two broad classes of materials:

(a) A mixture of the large variety of materials previously enumerated; and (b) A mixture of a single one of such materials with other products which normally could not serve as a vehicle, due to cost or to some particular physical or chemical property which would, it was hoped, modify the primary vehicle component.

One example of such modifier was shellac. Obviously, shellac, being brittle, could not serve as a vehicle per se, but it was hoped that shellac or similar materials would modify in a desirable manner one or more of the hundreds of amorphous resinous materials under examination.

The third examination was also concerned with a tertiary mixture, the vehicle of which fell into three classes:

(a) An admixture of the primary vehicle with two different vehicle additives;

(b) An admixture of two primary vehicle media with one vehicle additive; and (c) The mixture of three different vehicle principal media without any additive.

It need not be pointed out from what has been said immediately preceding that there was absolutely no basis for the selection of an appropriate vehicle, except pure chance or the equivalent.

As a matter of fact, what has been suggested previously is an over-simplification of a rather involved procedure. In the preferred form the vehicle contains three components and the finished stick contains five components, i. e., the three-component vehicle, plus the inhibitor, plus the weighting agent.

Having developed a vehicle, which, in absence of inhibitor and weighting agent, seemed to have approximately the correct physical and chemical properties, the next step was to modify the three-component vehicle (as far as the preferred form goes) so as to still exhibit the desired properties in presence of the weighting agent and inhibitor.

Figure 2:
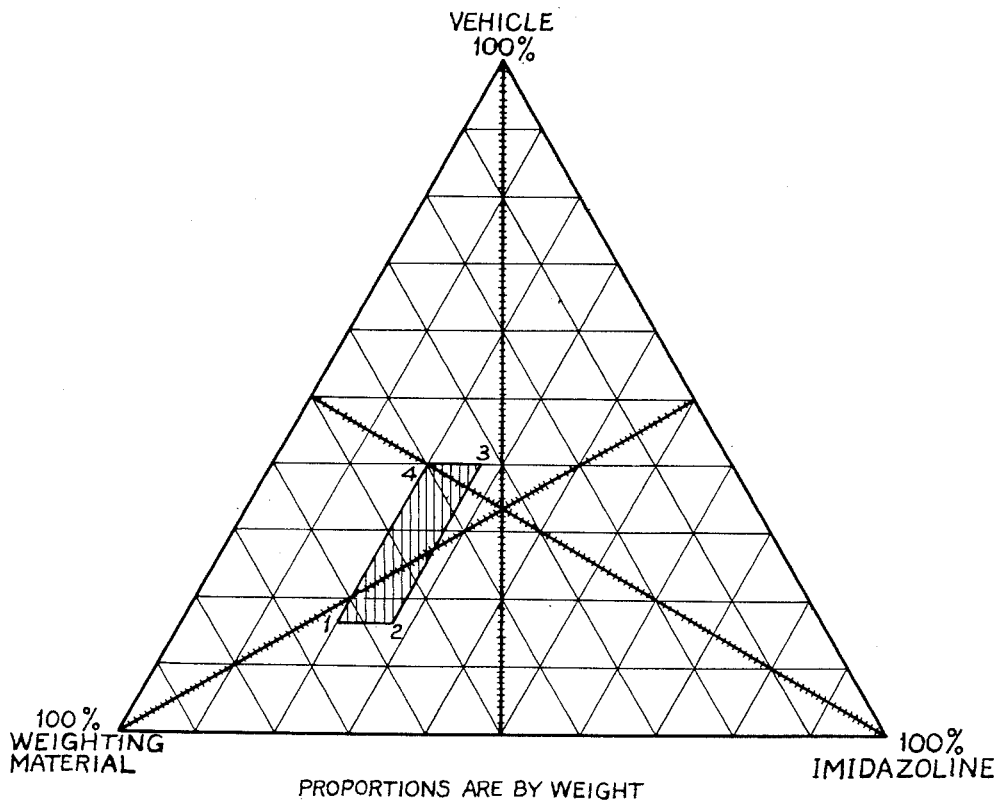

All of this is made plain by reference to the two hereto attached charts designated Figures 1 and 2.

Figure 1 is a conventional figure, which shows three constituents of the preferred vehicle on the basis of 100% by weight. One constituent is a thermoplastic, non-saponifiable hydrocarbon resin having a melting point in excess of approximately 225° F., described more fully elsewhere; the second apex indicates an amorphous wax, such as is described elsewhere, and the third component is a cellulose ether or ester of the kind described elsewhere. Note that the vehicle, based on these three components, is limited to the four-sided area defined approximately by points 1, 2, 3 and 4.

Reference is now made to Figure 2 which is again a three component system, in which the vehicle, the inhibitor and the weighting agent comprise the system. Here again, notice that the final composition represents a comparatively small four-sided area in the triangular graph, and defined approximately by points 1, 2, 3 and 4. This presentation involving the two triangular graphs, in effect, presents in a shorthand fashion, the difficulties encountered as enumerated subsequently.

The successful weighted form of inhibitor has been developed after many hundreds of experimental molds were discarded. It is believed desirable that a weighted stick should have a uniform density of at least 1.5, and preferably, 2.0 or more. This is accomplished by incorporating a weighting material which should exhibit the following characteristics: The weighting material should be of high density, so that it occupies as small a volume of the stick as possible, and yet will increase the density of the total mixture to the desired value; the weighting material should be in such a form as to allow for an even distribution throughout the stick, resulting in a uniform density; the weighting material should not otherwise affect the desirable physical properties of the stick, such as increase in brittleness, stickiness, or "tack," or appreciably alter the solvent characteristics of the stick or its melting point; the weighting material should be chemically inert towards the other ingredients and especially toward the inhibiting compound, and should be in itself non-corrosive; and the weighting material should not cause the stick to be poisonous or toxic, nor should it have any adverse effect on the operation of oil or gas wells, or their surface equipment, or upon their production.

Other obvious limitations are apparent, but are so numerous they need not be further specified, for example, the weighted stick form of inhibitor should be free from any deterioration or crystallization during aging; the surface of the stick should not be such as to cause firm adherence to the walls of the container, making difficult the removal of the container before introduction of the stick into the well; the chemical properties of the weighted mixture should be such as to allow ready manufacture, i. e., no toxic fumes should be evolved; the material when molten should readily pour at not too elevated a temperature for easy casting, or the consistency should be right for molding or extruding at some convenient temperature; no foaming should occur while molten, so that the stick, when cast, will be free of gas bubbles; after casting, the material should not shrink during cooling to the extent that a long "neck" is formed, extending inward from one end of the stick; the stick should be sufficiently tough to withstand normal handling and shipping without breaking; the melting point or softening point should be sufficiently high so that the stick remains hard and non-tacky to the touch after experiencing direct sun rays in summer; the solubility of the stick in hydrocarbons found in oil and gas wells, i. e., crude oil and kerosene, should be sufficiently low so that the stick would not be entirely dissolved during the first few hours after introduction down the well and the well returned to production.

As previously pointed out, the invention does not reside in the inhibitor per se, but in the particular form in which it is employed. Our preference is to use the inhibitors which have been described in Blair and Gross Patent No. 2,468,163, dated April 26, 1949. The particular inhibitors therein described represent substituted imidazolines selected from the class consisting of:

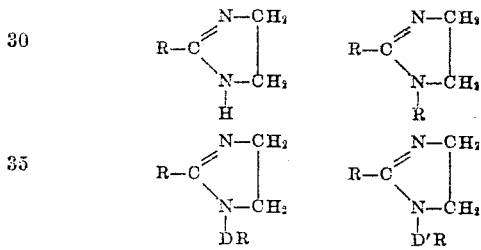

in which D represents a divalent, non-amino organic radical containing less than 25 carbon atoms, composed of elements from the group consisting of C, H, O, and N; D' represents a divalent organic radical containing less than 25 carbon atoms, composed of elements from the group consisting of C, H, O, and N, and containing at least one amino group; and R is a member of the class consisting of hydrogen and aliphatic and cycloaliphatic hydrocarbon radicals, with the proviso that at least one occurrence of R contains 8 to 32 carbon atoms.

More specifically, reference is made to the chemical formulae in said aforementioned Blair and Gross Patent No. 2,468,163, which depicts the actual composition and structure of a number of acceptable inhibitors. However, after considering the above formulae and what is said in the next paragraph immediately succeeding, it may be well to note that in the most generic description of the aforementioned Blair and Gross Patent No. 2,468,163 there are described compounds of the following composition:

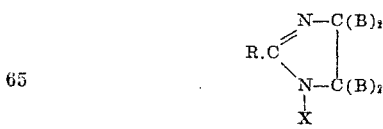

with the proviso that X be a member of the class of hydrogen atoms, R, DR, and D'R, as defined in the paragraph immediately preceding, and B is a member of the class selected from hydrogen atoms and an alkyl radical having not over 2 carbon atoms, with the proviso that at least three occurrences of B be hydrogen. Such derivatives are obtained from polypropyleneamines, polybutyleneamines, etc., in which the nitrogen atoms are still separated by two carbon atoms. Our preference is to use the imidazolines derived from the most readily available polyamines, to wit, the polyethyleneamines, such as diethylenetriamine, triethylenetetramine, tetraethylene pentamine and pentaethylenehexamine.

As has been pointed out in the aforementioned Blair and Gross patents, the imidazolines can be used as such, or in the form of salts, including, for example, the salts of monocarboxy detergent-forming acids, such as the salts of higher fatty acids, abietic acid, rosin, naphthenic acid, etc. Since the imidazolines are basic in character, the salts can be obtained obviously by neutralization of the acid or the saponification of the ester, or by other well known means.

Purely by way of illustration, we are including the following examples of the inhibitor as such, and subsequently, will include other examples showing the inhibitor in admixture, so as to give a solid of the kind specified:

EXAMPLE 1

A substituted imidazoline of the following formula:

$$R-C\underset{\underset{H}{N-CH_2}}{\overset{N=CH_2}{\diagup}}$$

in which R is a hydrocarbon radical containing 17 C atoms and 33 H atoms.

EXAMPLE 2

A substituted imidazoline of the following formula:

$$R'-C\underset{\underset{D}{N-CH_2}}{\overset{N=CH_2}{\diagup}}$$

in which R' is a hydrocarbon radical containing 17 C atoms and 35 H atoms; and D is an organic radical consisting of the elements C, H, and N, and consisting of 2 ethylene groups and 2 amine groups.

EXAMPLE 3

A substituted imidazoline of the following formula:

$$R''-C\underset{\underset{D'}{N-CH_2}}{\overset{N=CH_2}{\diagup}}$$

in which R'' is a hydrocarbon radical containing 19 C atoms and 29 H atoms; and D' is an organic radical consisting of the elements C, H, and N, and consisting of one ethylene group and one amine group.

EXAMPLE 4

A substituted imidazoline of the following formula:

$$R-C\underset{\underset{D''}{N-CH_2}}{\overset{N=CH_2}{\diagup}}$$

in which R is a hydrocarbon radical containing 17 C atoms and 33 H atoms; and D'' is an organic radical consisting of the elements C, H and N, and consisting of 3 ethylene groups and 3 amine groups.

The inhibitors illustrated above in Examples 1–4, partial salts of these inhibitors with selected acids, and others, are mixed and dissolved in carefully controlled amounts of organic and inorganic materials in order to produce a product with the desired physical characteristics.

The following examples show typical methods of manufacture of such products, the parts used being by weight:

EXAMPLE 1a

The following ingredients are melted together at 200° C.:

59 parts of the partial rosinate of the inhibitor of Example 3
11 parts Petrolite Corporation "Crown 500 Wax 190/195" (a high melting microcrystalline wax from domestic petroleum)
22 parts RBH Dispersions, Inc., "#510 Resin" (a high melting thermoplastic resin obtained by solvent extraction of Utah brown coal)
16 parts ethyl cellulose, 10–20 centipoises, "standard" grade When the above materials have formed a homogeneous molten mass, they are cooled to 150° C., and 80 parts finely-divided barium sulfate are stirred in until evenly dispersed. The mixture is then cast into cylinders 1½" in diameter and 18" long, to produce a stick with a density of 1.5.

EXAMPLE 2a 59 parts of the partial abietate of the inhibitor of Example 4
10 parts Bareco Oil Corp. "Be-Square Spec. Wax 19/195" (a high melting microcrystalline wax from domestic petroleum)
20 parts Velsicol Corp. "AB11-8" resin (a thermoplastic hydrocarbon resin obtained by polymerization of unsaturated petroleum fractions)
19 parts ethyl cellulose, 10–20 centipoises, "standard" grade The materials are melted together, as in Example 1a, above, and then 90 parts of powdered barium oxide are added at 150° C. When homogeneous the mixture is cast as in Example 1a, above, to produce a stick with a density of 1.6.

EXAMPLE 3a 50 parts inhibitor of Example 2
6 parts Warwick Wax Co. "Mekon 195/200" wax (a high melting microcrystalline wax from domestic petroleum)
26 parts Pan-American Chemicals "Resin 3-210" (a thermoplastic hydrocarbon resin of high iodine number obtained by polymerization of unsaturated hydrocarbons)
18 parts ethyl cellulose, 10–20 centipoises, "standard" grade The materials are melted together as in Example 1a, above, and then 129 parts of finely-divided litharge are stirred in. The mixture is cast as in Example 1a, above, to produce a stick with a density of 2.0.

EXAMPLE 4a 50 parts of inhibitor of Example 4
10 parts of F. W. Steadman Co. "DD 185/190 Wax" (a high melting microcrystalline wax from domestic petroleum)
25 parts Pan-American Chemicals "Panarez 6-210" (a thermoplastic hydrocarbon resin of high iodine number obtained by polymerization of unsaturated hydrocarbons)
15 parts ethyl cellulose, 10–20 centipoises, "standard" grade The materials are melted together as in Example 1a, above, and then 129 parts of finely-divided litharge are stirred in. The mixture is cast as in Example 1a, above, to produce a stick with a density of 2.0.

EXAMPLE 5a 55 parts of the partial abietate of the inhibitor of Example 3
10 parts ozokerite wax
20 parts Barrett Div., "Cumar Resin V2-½ (a coumarone indene resin)
15 parts ethyl cellulose, 10–20 centipoises, "standard" grade The materials are melted together as in Example 1a, above, and then 130 parts of finely-divided lead are stirred in. The mixture is cast as in Example 1a, above, to produce a stick with a density of 2.2.

EXAMPLE 6a 50 parts inhibitor of Example 4
10 parts Petrolite Corporation "Crown 700 Wax, 190/195" (a high melting microcrystalline wax from domestic petroleum)
25 parts Pan-American Chemicals Co. "Paraez 3–210" (a thermoplastic hydrocarbon resin of high iodine number obtained by polymerization of unsaturated hydrocarbons)
15 parts ethyl cellulose, 10–20 centipoises, "standard" grade The materials are melted together as in Example 1a, above, and then 129 parts of finely-divided litharge are stirred in. The mixture is cast as in Example 1a, above, to produce a stick with a density of 2.0.

EXAMPLE 7a 55 parts of the partial rosinate of the inhibitor of Example 2
10 parts F. W. Steadman Co. "FWS 180/195 Wax" (a high melting microcrystalline wax from domestic petroleum)
22 parts Neville Co. "Nevillac Hard" resin (a phenol-coumarone-indene resin)
13 parts Tennessee Eastman Corp. cellulose acetate butyrate "CAB 500–1" (the acetate-butyrate diester of cellulose)

The materials are melted together as in Example 1a, above, and then 129 parts of finely-divided litharge are stirred in. The mixture is cast as in Example 1a, above, to produce a stick with a density of 2.0.

EXAMPLE 8a 60 parts of the partial rosinate of the inhibitor of Example 1
7 parts Petrolite Corp. "Crown 500 Wax, 190/195" (a high melting microcrystalline wax from domestic petroleum)
20 parts Neville Co. "Nuba 2" resin (a phenol-coumarone-indene resin)
13 parts Tennessee Eastman Corp., cellulose acetate butyrate "CAB 500–1" (the acetate-butyrate diester of cellulose)

The materials are melted together as in Example 1a, above, and then 129 parts of finely-divided litharge are stirred in. The mixture is cast as in Example 1a, above, to produce a stick with a density of 2.0.

EXAMPLE 9a 55 parts of inhibitor of Example 3
10 parts Petrolite Corp. "Crown 1035 Wax" (a high melting microcrystalline wax from domestic petroleum)
20 parts Neville Co. "Neville R–10" resin (a phenol-coumarone-indene resin)
15 parts ethyl cellulose, 10–20 centipoises, "standard" grade The materials are melted together as in Example 1a, above, and then 129 parts of finely-divided litharge are stirred in. The mixture is cast as in Example 1a, above, to produce a stick with a density of 2.0.

EXAMPLE 10a 55 parts of the partial abietate of the inhibitor of Example 4
10 parts ozokerite
20 parts Velsicol Corp. "Velsicol AB–11–2" resin (a thermoplastic hydrocarbon resin obtained by polymerization of unsaturated hydrocarbons)
15 parts Tennessee Eastman Corp. cellulose acetate butyrate "CAB 500–1" (the acetate-butyrate diester of cellulose)

The materials are melted together as in Example 1a, above, and then 130 parts of finely-divided lead is stirred in. The mixture is cast as in Example 1a, above, to produce a stick with a density of 2.2.

Reference is made to the class specified as consisting of cellulose derivatives, such as the esters of low molal monocarboxy acids and ethers derived from alcohols having not more than 4 carbon atoms. This class specifically includes the organic solvent-soluble ethyl ethers, organic solvent-soluble propyl ethers, and organic solvent-soluble butyl ethers. As far as esters are concerned, the class concerns the organic solvent-soluble acetates, propionates, and butyrates. Obviously, mixed derivatives having these same groups may be used.

The cellulose ethers employed are those in which an ethyl, propyl, or butyl group has been introduced into the glucose unit of the cellulose. Various types of alkyl celluloses are manufactured. They may be considered as being in three groups:

(a) Ethers soluble in organic solvents;
(b) Ethers soluble in water; and
(c) Ethers soluble in alkali.

We employ the cellulose ethers of the kind which are ordinarily soluble in organic solvents. They should dissolve readily in the remaining two components of the vehicle, i. e., into wax-resin mixtures.

In preparing the solid stick form inhibitor, all that need be done is as follows: Select a suitable resin of the kind specified, such as a petroleum resin of the kind sold to replace coumarone-indene resins, or a coumarone-indene resin, or a resin derived from brown coal. These are furnished, among others, by the following companies: the Neville Company, Pittsburg 25, Pa.; Barrett Division, 40 Rector St., New York city, N. Y.; the Velsicol Co., Chicago, Illinois; the Pan-American Refining Co., Texas City, Texas; or the RBH Dispersions Division, Bound Brook, New Jersey. Select a suitable amorphous highmelting wax, such as ozokerite or wax sold by the Wax Division, Petrolite Corporation, Ltd., under the name of Crown Wax 500, 700, or 1035. Add to this mixture an organic solvent-soluble cellulose ether or ester which is soluble with the other two ingredients. Select the proportion so the ratios, by weight, come within the percentage weights or compositions of the parallelogram defined by points 1, 2, 3 and 4 of Figure 1. All that is required is to melt this wax and resin, and if the cellulose ether or ester has not melted, then continue to stir the mixture until it is dissolved through the entire mass and a homogeneous vehicle is obtained. The next step is to combine the vehicle with an imidazoline or its suitable partial salt of the kind specified, and also with a weighting material so the final composition is indicated by the percentage weights or compositions of the parallelogram indicated by the points 1, 2, 3 and 4, in Figure 2. Such mixture is stirred until thoroughly homogeneous and then poured into suitable molds without permitting any separation in any manner.

Reference is made to the previous examples which illustrate the manufacture of the stick inhibitor in a single one-step process. However, as an illustration of a two-step process in which the vehicle is first prepared and subsequently mixed with the inhibitor and weighting material, the following examples will serve, in which percentages are by weight:

EXAMPLE 1b

25% Velsicol Corp. "AB11–8" resin (a thermoplastic hydrocarbon resin obtained by polymerization of unsaturated hydrocarbons)
25% Bareco Oil Co. "Be Square Spec. Wax 190/195" (a high melting microcrystalline wax from domestic petroleum)
50% ethyl cellulose, 10–20 centipoises, "standard"

The materials are mixed together at 200° C., until molten and homogeneous.

EXAMPLE 2b

40% Barrett Div. "Cumar Resin V2–½" (a coumarone-indene resin)
10% Petrolite Corp. "Crown 700" wax (a high melting microcrystalline wax from domestic petroleum)
50% ethyl cellulose, 10–20 cps. Standard The materials are blended together as in Example 1b, preceding.

EXAMPLE 3b

65% Pan American "Panarez #3–210" resin (a thermoplastic hydrocarbon resin of high iodine number obtained by polymerization of unsaturated hydrocarbons)
10% Warwick Wax Co. "Mekon 195/200" wax (a high melting microcrystalline wax from domestic petroleum)
25% Tennessee Eastman Corp. cellulose acetate butyrate "CAB 500–1" (the acetate-butyrate diester of cellulose)

The materials are blended together as in Example 1b, preceding.

EXAMPLE 4b

50% RBH Dispersions "#510 resin" (a high melting thermoplastic resin obtained by solvent extraction of Utah brown coal)
25% Petrolite Corp. "Crown 500" wax (a high melting microcrystalline wax from domestic petroleum)
25% Tennessee Eastman cellulose acetate butyrate "CAB500–1" (the acetate-butyrate diester of cellulose)

The materials are blended together as in Example 1b, preceding.

EXAMPLE 5b

50% RBH Dispersions "510 Resin" (a high melting thermoplastic resin obtained by solvent extraction of Utah brown coal)
20% Petrolite Corp. "Crown 700" wax (a high melting microcrystalline wax from domestic petroleum)
30% ethyl cellulose, 10–20 cps., standard The materials are blended together as in Example 1b, preceding.

EXAMPLE 6b

40% Pan American "Panarez #6–210 Resin" (a thermoplastic hydrocarbon resin of high iodine number obtained by polymerization of unsaturated hydrocarbons)
20% F. W. Steadman Co. "DD 185/190 Wax" (a high melting microcrystalline wax from domestic petroleum)
40% ethyl cellulose, 10–20 cps. standard The materials are blended together as in Example 1b, preceding.

Having obtained the vehicle as described above, it can be stored for use or immediately combined, as illustrated by the following examples, in which percentages are by weight:

EXAMPLE 1c

20% imidazoline inhibitor
18% vehicle of Example 2b
62% finely-divided lead

The vehicle and inhibitor are blended together at 140° C. and the powdered lead stirred in until homogeneous, at which point the material is cast into rods or sticks.

EXAMPLE 2c

28% partial rosinate of imidazoline inhibitor
18% vehicle of Example 2b
54% finely-divided litharge The materials are blended and stick cast as in Example 1c, preceding.

EXAMPLE 3c

28% partial abietate of imidazoline inhibitor
40% vehicle of Example 4b
32% finely-divided barium sulfate The materials are blended and stick cast as in Example 1c, preceding.

EXAMPLE 4c

20% imidazoline inhibitor
40% vehicle of Example 6b
40% finely-divided litharge

The materials are blended and stick cast as in Example 1c, preceding.

EXAMPLE 5c

25% imidazoline inhibitor
30% vehicle of Example 1b
45% finely-divided lead

The materials are blended and stick cast as in Example 1c, preceding.

EXAMPLE 6c

22% imidazoline inhibitor
22% vehicle of Example 5b
56% finely-divided litharge

The materials are blended and stick cast as in Example 1c, preceding.

In addition to the weighting materials employed by way of illustration in the preceding examples (barium oxide, barium sulfate, powdered lead, and litharge), other dense materials in powder form may be equally useful in the formation of solid inhibitors with an average density of 1.5 or greater.

From considerations of availability and cost, and because of considerations already discussed, certain dense materials are preferred above others. Powdered lead metal and lead oxides are especially useful. Iron oxides would be equally useful if it were not for the fact that their use invalidates the control of corrosion rate by the analysis of produced brines for iron content.

In the appended claims the melting point of the waxes employed refers to the ASTM method for determination of melting point of petrolatum, Specification D127-30, which method is commonly accepted by the trade for the specification of melting point of mineral waxes and paraffins. The melting point of resins refers to the ASTM ring and ball method for the determination of softening point of bituminous materials, D36-26, which method is commonly accepted by the trade for the specification of melting point of resins.

Having thus described our invention, what we claim as new and desire to secure by Letters Patent is:

1. A high-melting solid stick-form corrosion inhibitor for oil, and gas well equipment, having a specific gravity in excess of 1.5 and being of the following composition: (a) Weighting material selected from a member of the class consisting of lead oxide, barium sulfate, and metallic lead; and (b) a member selected from the group consisting of substituted imidazoline and its partial salt selected from the class consisting of

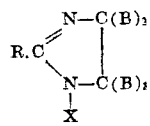

in which B is a member selected from the class consisting of hydrogen atoms and an alkyl radical having not over 2 carbon atoms, with the proviso that at least three occurrences of (B) be hydrogen, and X is selected from the class of hydrogen atoms, R, DR, and D'R, in which D represents a divalent, non-amino, organic radical containing less than 25 carbon atoms, composed of elements from the group consisting of C, H, O, and N; D' represents a divalent organic radical containing less than 25 carbon atoms composed of elements from the group consisting of C, H, O, and N, and containing at least one amino group, and R is a member of the class consisting of hydrogen and aliphatic and cycloaliphatic hydrocarbon radicals, with the proviso that at least one occurrence of R contains 8 to 32 carbon atoms; and (c) a vehicle; said ratio of ingredients being approximately within the weight percentages specified by the parrallelogram defined by points 1, 2, 3, and 4 in Figure 2; with the further proviso that the vehicle (c) specified immediately above shall be composed of (1) and amorphous high-melting mineral wax; (2) an organic solvent-soluble cellulose derivative selected from the class of esters derived from monocarboxy acids having not more than 4 carbon atoms and ethers derived from alcohols not having more than 4 carbon atoms, and (3) a thermoplastic non-saponifiable hydrocarbon resin having a melting point in excess of approximately 225° F., selected from the class of coumarone-indene resins, coumarone-indene type petroleum resins, and resins obtained by the extraction of brown coal; and with the final proviso that said ratio of ingredients (1); (2); and (3), be approximately within the weight percentages specified by the parallelogram defined by points 1, 2, 3 and 4 in Figure 1.

2. An inhibitor of the kind described in claim 1, wherein the resin employed is a petroleum resin of the coumarone-indene type having a melting point of approximately 225° F. by the ring and ball method, and the wax is a high melting mineral wax derived from domestic petroleum and having a melting point (by A. S. T. M. D127-30 method for melting point of petrolatum) of approximately 190° F.-200° F.

3. An inhibitor of the kind described in claim 1, wherein the vehicle is composed of (1) a petroleum resin of the coumarone-indene type having a melting point of approximately 225° F. by the ring and ball method, (2) a high-melting mineral wax derived from domestic petroleum and having a melting point (by A. S. T. M. D127-30 method for melting point of petrolatum) of approximately 190° F.-200° F., and (3) is ethyl cellulose.

4. An inhibitor of the kind described in claim 1 wherein the vehicle is composed of (1) a petroleum resin of the coumarone-indene type having a melting point of approximately 225° F. by the ring and ball method, (2) a high melting mineral wax derived from domestic petroleum and having a melting point (by A. S. T. M. D127-30 method for melting point of petrolatum) of approximately 190° F.-200° F., and (3) ethyl cellulose, and the weighting material is litharge.

5. An inhibitor of the kind described in claim 1, wherein the vehicle is composed of (1) a petroleum resin of the coumarone-indene type having a melting point of approximately 225° F. by the ring and ball method, (2) a high melting mineral wax derived from domestic petroleum and having a melting point (by A. S. T. M. D127-30 method for melting point of petrolatum) of approximately 190° F.-200° F., and (3) ethyl cellulose, the weighting material is litharge, and the imidazoline is of the formula

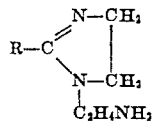

wherein R is a member of the class consisting of aliphatic and cycloaliphatic hydrocarbon radicals containing 8 to 32 carbon atoms.

6. An inhibitor of the kind described in claim 1, wherein the vehicle is composed of (1) a petroleum resin of the coumarone-indene type having a melting point of approximately 225° F. by the ring and ball method, (2) a high-melting mineral wax derived from domestic petroleum and having a melting point (by A. S. T. M. D127-30 method for melting point of petrolatum) of approximately 190° F.-200° F., and (3) ethyl cellulose, the weighting material is litharge, and the imidazoline is of the formula

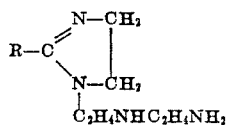

wherein R is a member of the class consisting of aliphatic and cycloaliphatic hydrocarbon radicals containing 8 to 32 carbon atoms.

7. An inhibitor of the kind described in claim 1, wherein the vehicle is composed of (1) a petroleum resin of the coumarone-indene type having a melting point of approximately 225 F. by the ring and ball method, (2) a high-melting mineral wax derived from domestic petroleum and having a melting point (by A. S. T. M. D127-30 method for melting point of petrolatum) of approximately 190 F.-200° F., and (3) ethyl cellulose, the weighting material is litharge, and the imidazoline is of the formula

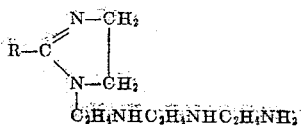

wherein R is a member of the class consisting of aliphatic and cycloaliphatic hydrocarbon radicals containing 8 to 32 carbon atoms.

8. An inhibitor of the kind described in claim 1, wherein the vehicle is composed of (1) a petroleum resin of the coumarone-indene type having a melting point of approximately 225° F. by the ring and ball method, (2) a high melting mineral wax derived from domestic petroleum and having a melting point (by A. S. T. M. D127-30 method for melting point of petrolatum) of approximately 190° F.-200° F., and (3) ethyl cellulose, the weighting material is litharge, and the imidazoline is of the formula

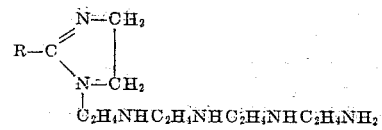

wherein R is a member of the class consisting of aliphatic and cycloaliphatic hydrocarbon radicals containing 8 to 32 carbon atoms.

WILLIAM F. GROSS.
CHARLES C. ROGERS, JR.

REFERENCES CITED

The following references are of record in the file of this patent:

UNITED STATES PATENTS

| Number | Name | Date |
|---|---|---|
| Re. 23,227 | Blair et al. | May 9, 1950 |
| 2,466,517 | Blair | Apr. 5, 1949 |